(12) United States Patent
Sakai et al.

(10) Patent No.: US 8,111,051 B2
(45) Date of Patent: Feb. 7, 2012

(54) STEP-DOWN SWITCHING REGULATOR

(75) Inventors: Masaru Sakai, Kyoto (JP); Kiyotaka Umemoto, Kyoto (JP)

(73) Assignee: Rohm Co., Ltd. (JP)

( * ) Notice: Subject to any disclaimer, the term of this patent is extended or adjusted under 35 U.S.C. 154(b) by 999 days.

(21) Appl. No.: 11/993,093

(22) PCT Filed: Apr. 20, 2006

(86) PCT No.: PCT/JP2006/308340
§ 371 (c)(1),
(2), (4) Date: Dec. 19, 2007

(87) PCT Pub. No.: WO2006/137213
PCT Pub. Date: Dec. 28, 2006

(65) Prior Publication Data
US 2010/0156366 A1    Jun. 24, 2010

(30) Foreign Application Priority Data
Jun. 21, 2005    (JP) .................................. 2005-180802

(51) Int. Cl.
*G05F 1/613* (2006.01)
(52) U.S. Cl. ........................................ 323/224; 323/284
(58) Field of Classification Search .................. 323/224, 323/283, 284
See application file for complete search history.

(56) References Cited

U.S. PATENT DOCUMENTS

| | | | | |
|---|---|---|---|---|
| 6,307,356 B1 * | 10/2001 | Dwelley | ........................ | 323/282 |
| 7,576,529 B2 * | 8/2009 | Ishino | ........................... | 323/284 |
| 7,714,560 B2 * | 5/2010 | Fukumori | ...................... | 323/284 |
| 7,800,351 B2 * | 9/2010 | Gan | ............................... | 323/283 |
| 7,859,239 B2 * | 12/2010 | Yamada | ........................ | 323/283 |
| 2009/0146631 A1 * | 6/2009 | Fukumori | ...................... | 323/284 |
| 2009/0237053 A1 * | 9/2009 | Gan | ............................... | 323/283 |
| 2010/0315054 A1 * | 12/2010 | Gan | ............................... | 323/283 |

FOREIGN PATENT DOCUMENTS

| | | |
|---|---|---|
| JP | 2002-252971 A | 9/2002 |
| JP | 2002-281743 A | 9/2002 |
| JP | 2003-230271 A | 8/2003 |
| JP | 2003-244946 A | 8/2003 |
| JP | 2004-32875 A | 1/2004 |

OTHER PUBLICATIONS

Chinese Office Action for Chinese Patent Application No. 200680020624.3 issued Nov. 7, 2008 with English Translation.
Korean Office Action for Application No. 10-2008-7000081 and English translation dated Nov. 23, 2009.

(Continued)

*Primary Examiner* — Shawn Riley
(74) *Attorney, Agent, or Firm* — Cantor Colburn LLP

(57) ABSTRACT

An output monitoring comparator outputs an ON signal when an output voltage becomes lower than a reference voltage. A pulse modulator generates a pulse signal at a predetermined level, an ON time-period from when the ON signal is outputted. A driver circuit alternately turns ON, after a dead time, a switching transistor and a synchronous rectification transistor, based on the pulse signal. A light load mode detector compares a switching voltage at a connection point of the switching transistor and the synchronous rectification transistor, and ground potential, and at timing at which the ON signal is outputted from the output monitoring comparator, when the switching voltage is higher than the ground potential, nullifies the ON signal.

12 Claims, 10 Drawing Sheets

OTHER PUBLICATIONS

International Search Report for International Application No. PCT/JP2006/308340 mailed Jun. 13, 2006.
Written Opinion of the International Searching Authority for PCT/JP2006-308340 mailed Jun. 13, 2006.
Notification of Reason(s) for Refusal for Japanese Application No. 2005-180802 dispatched Mar. 8, 2011 with English translation.
Notification of Reason(s) for Refusal for Japanese Patent Application No. 2005-180802, mailed Sep. 27, 2011, with English translation.

* cited by examiner

STEP-DOWN SWITCHING REGULATOR

CROSS REFERENCE TO RELATED APPLICATIONS

This is a U.S. national stage of application No. PCT/JP2006/308340, filed on 20 Apr. 2006. Priority under 35 U.S.C. §119(a) and 35 U.S.C. §365(b) is claimed from Japanese Application No. 2005-180802, filed 21 Jun. 2005, the disclosure of which is also incorporated herein by reference.

FIELD OF THE INVENTION

The present invention relates to a step-down switching regulator, and in particular to control technology for a synchronous rectification type of switching regulator.

DESCRIPTION OF THE RELATED ART

In recent years, microprocessors for performing digital signal processing are being installed in various electronic devices, such as mobile telephones, PDAs (Personal Digital Assistants), laptop computers, and the like. Power supply voltage necessary for driving these microprocessors decreases with miniaturization of semiconductor manufacturing processes, and there are devices that operate at low voltages of 1.5 V or below.

At the same time, lithium-ion batteries or the like are installed as power sources in these electronic devices. Since the voltage outputted from lithium-ion batteries is approximately 3 V to 4 V, and since power consumption is wasted in supplying the voltage as it is to the microprocessor, in general, battery voltage is stepped down using a step-down type of switching regulator, a series regulator, or the like, and the voltage is made constant, to be supplied to the microprocessor.

With regard to the step-down type of switching regulator, there is a type that uses a diode for rectification (referred to below as a diode rectification type), and a type that uses a transistor for rectification (referred to below as a synchronous rectification type) instead of the diode. The former has an advantage in that high efficiency can be obtained when a load current flowing in a load is small, but since a diode is necessary in addition to an inductor and a capacitor outside a control circuit, circuit area becomes large. With the latter, when current supplied to the load is small, efficiency is inferior compared to the former, but since the transistor is used instead of the diode, integration is possible inside an LSI, and circuit area including peripheral parts can be miniaturized. With regard to electronic devices such as mobile telephones and the like, in cases in which miniaturization is required, the switching regulator that uses a transistor for synchronous rectification (referred to below as a synchronous rectification switching regulator) is often employed. For example, Patent Documents 1 and 2 disclose a synchronous rectification type and a diode rectification type of switching regulator.

Here, with a synchronous rectification type of step-down switching regulator, efficiency becomes problematic when the load current is small. When the load current is small, current flowing in an output inductor decreases, and eventually flows in a negative direction. When the current flowing in the output inductor becomes negative, in a time-period in which the synchronous rectification transistor is ON, since the current flowing in the output inductor flows to ground via the synchronous rectification transistor, power consumption is wasted.

In order to improve the efficiency of the synchronous rectification type of the step-down switching regulator when loading is light, a method is known in which a resistance element is arranged in series with a synchronous rectification transistor or an output inductor, and a light load state is detected, based on voltage across two ends of the resistance element (Patent Document 3).

Patent Document 1: Japanese Patent Application, Laid Open No. 2004-32875
Patent Document 2: Japanese Patent Application, Laid Open No. 2002-252971
Patent Document 3: Japanese Patent Application, Laid Open No. 2003-244946

A resistance element arranged in series with a synchronous rectification transistor described in Patent Document 3 uses a small resistance value, in order to inhibit power losses. Accordingly, voltage drop across the resistance element has a small value of about several mV to several tens of mV. When the voltage across the two ends of this resistance element is detected using a comparator, since it is necessary to use a comparator with a very small offset voltage, there has been a problem in that circuit area increases.

SUMMARY OF THE INVENTION

The present invention has been carried out in view of these problems, and has as a general purpose the provision of a step-down switching regulator which improves efficiency when loading is light, while curtailing an increase in circuit area, and of a control circuit therefor.

An embodiment of the present invention relates to a control circuit of a synchronous rectification type of step-down switching regulator. The control circuit includes: an output monitoring comparator which compares output voltage of the switching regulator and a reference voltage that is a target value therefor, and when the output voltage goes lower than the reference voltage, outputs an ON signal; a pulse modulator which generates a pulse signal which goes to a predetermined level in a predetermined ON time from when the ON signal was outputted from the output monitoring comparator; a driver circuit which generates a first and a second control signal based on the pulse signal outputted from the pulse modulator, and alternately turns ON, after a dead time, a switching transistor by the first control signal and a synchronous rectification transistor by the second control signal; and a light load mode detector which compares a switching voltage occurring at a connection point of the switching transistor and the synchronous rectification transistor, with a predetermined threshold voltage, and at timing at which the ON signal is outputted from the output monitoring comparator, when the switching voltage is higher than the threshold voltage, nullifies the ON signal. The threshold voltage may be ground potential.

The dead time is provided for the synchronous rectification type of step-down switching regulator so that the switching transistor and the synchronous rectification transistor are not ON at the same time. When loading is heavy, since current flowing in an output inductor is positive, in the dead time, a body diode of the synchronous rectification transistor is ON and switching voltage has a negative potential. On the other hand, in a light load state, since current flowing in the output inductor is negative, in the dead time, the body diode of the switching transistor is ON. When the current flows in the body diode of the switching transistor, since the switching voltage has a positive potential, it is possible to detect occurrence of a light loading state by comparing the switching potential and the threshold voltage. By detecting the light loading state in this way and nullifying the ON signal, the switching transistor is prevented from being ON. As a result thereof, the output voltage rises, and since a switching operation stops in a time-period until the output voltage eventually decreases to the reference voltage, gate drive current is diminished, and high efficiency can be realized.

At timing at which the second control signal is inputted and the ON signal is outputted from the output monitoring comparator, when the switching voltage is higher than the threshold voltage, the light load mode detector may delay and output the second control signal to the pulse modulator. The pulse modulator may generate the pulse signal based on a result of a logical operation on the second control signal, which is delayed, and the ON signal.

By performing the logical operation on the second control signal and the ON signal by an AND gate or the like, in cases in which the second control signal is delayed, the ON signal can be nullified.

The light load mode detector may include a light load detection comparator which compares the switching voltage at the connection point of the switching transistor and the synchronous rectification transistor, with the threshold voltage, a first flip-flop circuit which is set by the second control signal and reset by an output signal of the light load detection comparator, and a delay circuit which becomes active in a state in which the first flip-flop circuit is set, and delays the second control signal, and in an inactive state, outputs the second control signal without a delay being given thereto. The pulse modulator may generate the pulse signal based on a result of a logical operation on an output signal of the delay circuit and the ON signal.

By providing the light load detection comparator, and controlling active and inactive states of the delay circuit that gives a delay to the second control signal, based on the output signal of this light load detection comparator, it is possible to nullify the ON signal when loading is light.

The delay circuit may include a first transistor, a delay resistor, and a second transistor connected in series between a power supply voltage and ground, and a delay capacitor and a third transistor connected in series between a connection point of the delay resistor and the second transistor, and ground. The second control signal may be inputted to control terminals of the first and the second transistor, and also output of the first flip-flop circuit may be inputted to a control terminal of the third transistor, and a connection point of the delay resistor and the second transistor may be an output terminal of the delay circuit.

In such cases, in a time-period in which the third transistor is ON, a CR circuit is formed by the delay capacitor and the delay resistor, and it is possible to give a delay to the second control signal.

The pulse modulator may include a second flip-flop circuit set by the ON signal, and an ON time setting circuit which, after an ON time has passed from when the second flip-flop circuit was set, resets the second flip-flop circuit, and an output signal of the second flip-flop circuit may be outputted as the pulse signal.

In such cases, it is possible to freely set the ON time in which the switching transistor is ON, by the ON time setting circuit.

The driver circuit may include a third flip-flop circuit that is set by a signal, which is the inverse of the pulse signal, and is reset by the ON signal, and may generate the second control signal based on an output signal of the third flip-flop circuit.

In such cases, also when the ON signal is nullified when loading is light, it is possible to preferably turn the synchronous rectification transistor OFF.

Another embodiment of the present invention is a step-down switching regulator. The step-down switching regulator is provided with a switching regulator output circuit including a switching transistor and a synchronous rectification transistor, connected in series between an input terminal and ground, and the abovementioned control circuit which drives the switching transistor and the synchronous rectification transistor.

According to this embodiment, it is possible to improve efficiency in cases in which output current of the step-down switching regulator decreases.

Another embodiment of the present invention is an electronic device. This electronic device is provided with a battery, a microprocessor, and the abovementioned step-down switching regulator which steps down voltage of the battery to supply the microprocessor.

According to this embodiment, in cases in which consumed current of the microprocessor decreases, the efficiency of the step-down switching regulator can be improved, and it is possible to extend the battery life.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
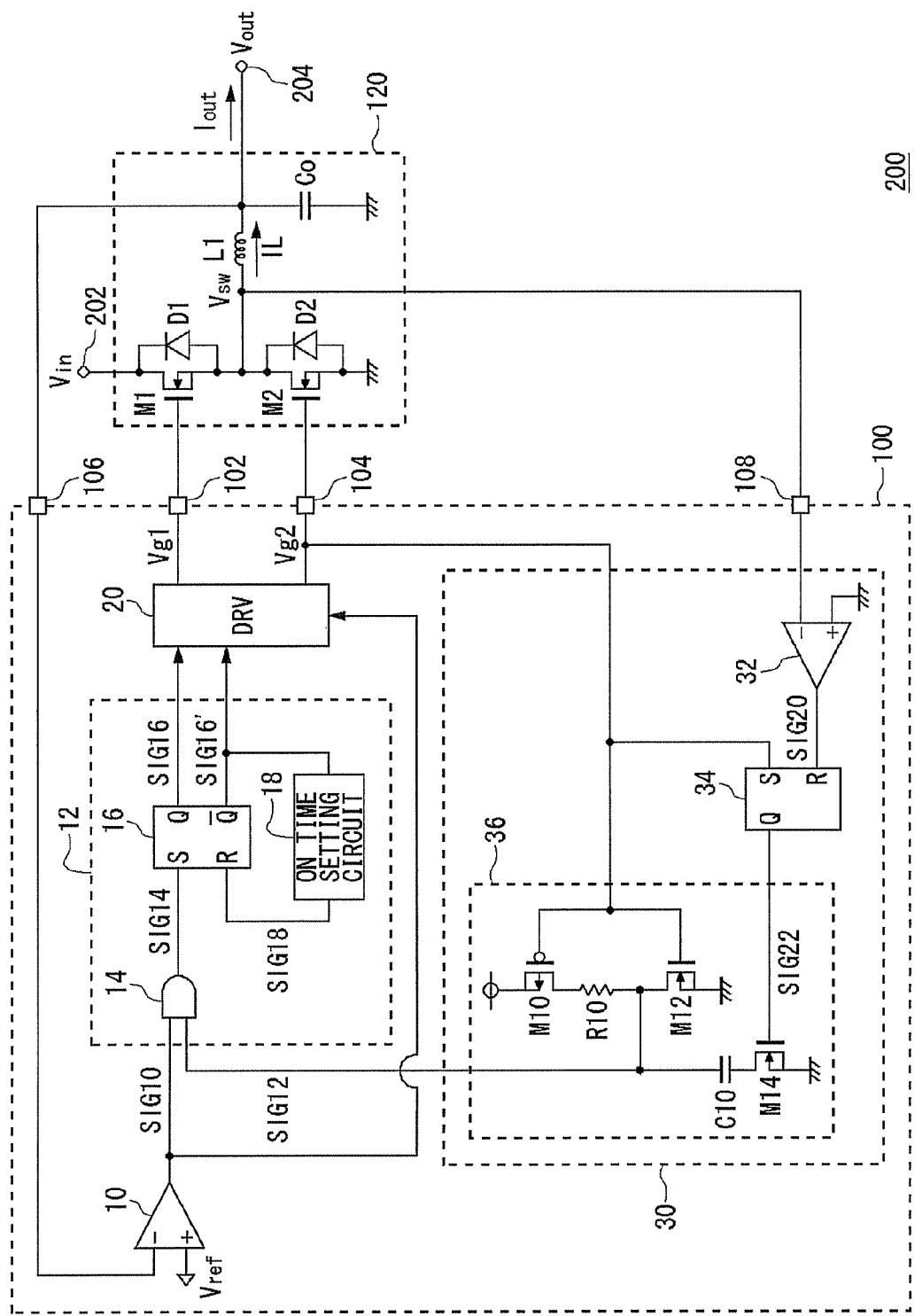
FIG. 1 is a circuit diagram showing a configuration of a step-down switching regulator according to a first embodiment.
Figure 2:
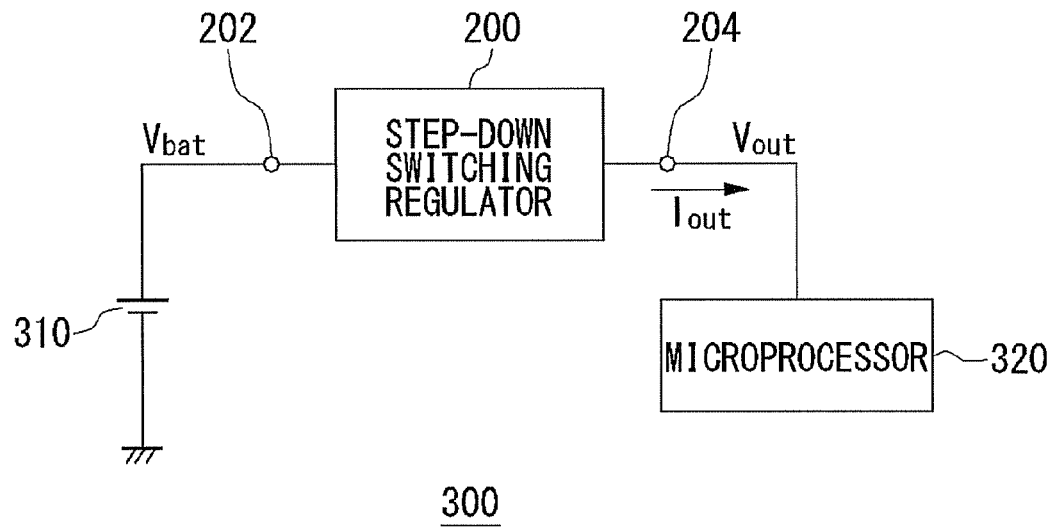
FIG. 2 is a block diagram showing a configuration of an electronic device in which the step-down switching regulator of FIG. 1 is installed.

FIG. 1 is a circuit diagram showing a configuration of a step-down switching regulator 200 according to a first embodiment. FIG. 2 is a block diagram showing a configuration of an electronic device 300 in which the step-down switching regulator 200 of FIG. 1 is installed. The electronic device 300 is, for example, a laptop personal computer, and is provided with a battery 310, a microprocessor 320 and the step-down switching regulator 200.

The battery 310 is configured from, for example, a plurality of lithium-ion battery cells, and outputs a battery voltage Vbat of about 12 V. The microprocessor 320 performs various arithmetic processing, is a block that performs overall control of the entire electronic device 300, and is an LSI that operates with a power supply voltage of about 1.5 V.

The step-down switching regulator 200 according to the present embodiment steps down the battery voltage Vbat of about 12 V, to supply the power supply voltage of the microprocessor 320. The microprocessor 320 consumes a large current when performing the arithmetic processing, and in a standby state in which arithmetic processing is not being carried out, consumed current is decreased to realize power saving. Accordingly, current Iout flowing from the step-down switching regulator 200 to the microprocessor 320 varies considerably according to operation state of the microprocessor 320. The step-down switching regulator 200 according to the present embodiment is preferably used in an application in which voltage conversion is performed at a high efficiency, with a device, which operates in a mode with a very small consumed current, as a load. Below, a configuration of the step-down switching regulator 200 is explained in detail, based on FIG. 1.

The step-down switching regulator 200 includes a switching regulator output circuit 120 and a control circuit 100. The switching regulator output circuit 120 is an output circuit of a general synchronous rectification type of step-down switching regulator; the switching regulator output circuit 120 steps down an input voltage Vin applied to an input terminal 202, and outputs an output voltage Vout from an output terminal 204. The input voltage Vin is the battery voltage Vbat of FIG. 2. A switching transistor M1 and a synchronous rectification transistor M2 are connected in series between the input terminal 202 and ground. The switching transistor M1 and the synchronous rectification transistor M2 are N-channel MOS transistors, and ON/OFF control is performed by a first control signal Vg1 and a second control signal Vg2 applied to a gate. In the figure, D1 and D2 show body diodes (parasitic diodes) present between drain and back gate of the switching transistor M1 and the synchronous rectification transistor M2.

An output inductor L1 is provided between a connection point of the switching transistor M1 and the synchronous rectification transistor M2, and the output terminal 204. An output capacitor Co is provided between the output terminal 204 and ground. In the present embodiment, voltage at the connection point of the switching transistor M1 and the synchronous rectification transistor M2 is referred to as a switching voltage Vsw. Furthermore, a current flowing in the output inductor L1 is referred to as an inductor current IL. This inductor current IL is positive in a direction flowing towards the output capacitor Co. Moreover, a current flowing from the output capacitor Co via the output terminal 204 to a load is referred to as an output current Iout.

A control circuit 100 generates the first control signal Vg1 and the second control signal Vg2 to be applied to a gate of the switching transistor M1 and the synchronous rectification transistor M2, and performs ON/OFF control of the switching transistor M1 and the synchronous rectification transistor M2. In the step-down switching regulator 200, by repeatedly and alternately turning ON and OFF the switching transistor M1 and the synchronous rectification transistor M2, energy conversion is carried out by the output inductor L1, and the input voltage Vin is stepped down. The stepped-down voltage is smoothed by the output inductor L1 and the output capacitor Co, and is outputted as the output voltage Vout.

The control circuit 100 is an LSI chip integrated on one semiconductor substrate. In the present embodiment, the switching transistor M1 and the synchronous rectification transistor M2 are arranged outside the control circuit 100, but may be built-in, in the control circuit 100. The control circuit 100 is provided with a first switching terminal 102, a second switching terminal 104, a feedback terminal 106, and a switching voltage detection terminal 108, as terminals for input and output. The first switching terminal 102 is connected to a gate of the switching transistor M1, and the second switching terminal 104 is connected to a gate of the synchronous rectification transistor M2. The first control signal Vg1 and the second control signal Vg2 are outputted respectively from the first switching terminal 102 and the second switching terminal 104. The feedback terminal 106 is connected to the output terminal 204 of the step-down switching regulator 200, and is a terminal to which the output voltage Vout of the step-down switching regulator 200 is fed back. The switching voltage detection terminal 108 is connected to the switching transistor M1 and the synchronous rectification transistor M2, and the switching voltage Vsw is inputted thereto.

The control circuit 100 includes an output monitoring comparator 10, a pulse modulator 12, a driver circuit 20, and a light load mode detector 30. The control circuit 100 alternately repeats a first state in which the switching transistor M1 is ON and the synchronous rectification transistor M2 is OFF in a predetermined ON time-period Ton, and a second state in which the synchronous rectification transistor M2 is ON and the switching transistor M1 is OFF. Between the first state and the second state, a time-period (referred to as a dead time Td, below) is provided in which neither the switching transistor M1 nor the synchronous rectification transistor M2 is ON.

In the first state, in the predetermined ON time-period Ton, the control circuit 100 charges the output capacitor Co via the switching transistor M1, and raises the output voltage Vout slightly. After the ON time-period has passed, there is a transition to the second state, and the synchronous rectification transistor M2 is turned ON. In the second state, when the output voltage Vout decreases to a predetermined reference voltage Vref, the control circuit 100 transitions to the first state once again.

This transition between the first state and the second state is carried out by the output monitoring comparator 10 and the pulse modulator 12. With regard to the output monitoring comparator 10, the output voltage Vout of the step-down switching regulator 200 is inputted to the inverted input terminal, and the reference voltage Vref is inputted to the non-inverted input terminal. With regard to the output monitoring comparator 10, the output voltage Vout of the step-down switching regulator 200 and the reference voltage Vref are compared, and if the output voltage Vout is lower than the reference voltage Vref, a high level ON signal SIG10 is outputted. The pulse modulator 12 generates a pulse signal SIG16 having a high level, in the predetermined ON time-period Ton from when the ON signal SIG10 was outputted from the output monitoring comparator 10. The output monitoring comparator 10 may divide the output voltage Vout by a resistance to compare with the reference voltage Vref.

The pulse modulator 12 includes an AND gate 14, a second RS flip-flop circuit 16, and an ON time setting circuit 18. The AND gate 14 outputs a logical product of the ON signal SIG10 outputted from the output monitoring comparator 10 and the light load detection signal SIG12 outputted from the light load mode detector 30. An output signal SIG14 of the AND gate 14 is inputted to a set terminal of the second RS flip-flop circuit 16, and when the light load detection signal SIG12 has a high level, setting is performed according to the ON signal SIG10.

An inverted output signal SIG16' of the second RS flip-flop circuit 16 is inputted to the ON time setting circuit 18. The ON time setting circuit 18 outputs a reset signal SIG18 at a high level, after the predetermined ON time Ton has passed from when the second RS flip-flop circuit 16 was set. The second RS flip-flop circuit 16 is reset by this reset signal SIG18. The output signal SIG16 of the second RS flip-flop circuit 16 goes to a high level, in a time-period until the ON time Ton has passed from when the ON signal SIG10 was outputted from the output monitoring comparator 10, and after that, goes to a low level in a time-period until the ON signal SIG10 is once again outputted. The pulse modulator 12 outputs the output signal SIG16 and the inverted output signal SIG16' of the second RS flip-flop circuit 16 as pulse signals.

Figure 3:
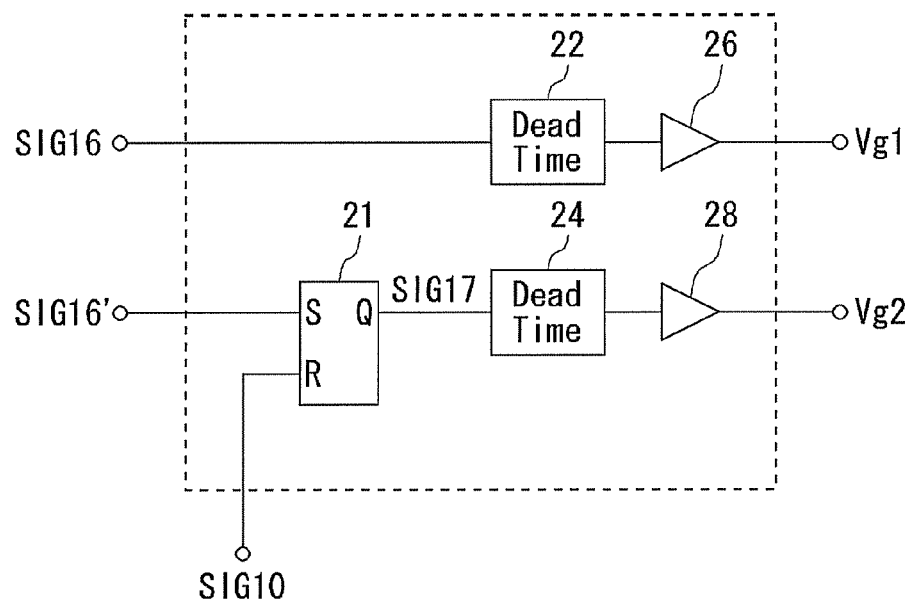
FIG. 3 is a circuit diagram showing a configuration of a driver circuit of FIG. 1.

The driver circuit 20, after the dead time Td, alternately turns ON the switching transistor M1 and the synchronous rectification transistor M2, based on the pulse signals SIG16 and SIG16' outputted from the pulse modulator 12 and the ON signal SIG10 outputted from the output monitoring comparator 10. FIG. 3 is a circuit diagram showing a configuration of the driver circuit 20. The driver circuit 20 includes a third RS flip-flop circuit 21, a first dead time generation circuit 22, a second dead time generation circuit 24, a first buffer circuit 26, and a second buffer circuit 28.

The first dead time generation circuit 22 and the first buffer circuit 26 generate the first control signal Vg1 based on the pulse signal SIG16. The first dead time generation circuit 22 makes this output at a high level after a predetermined dead time Td has passed from a rising edge (referred to below as a positive edge) of the pulse signal SIG16, and makes this output at a low level at the same time as a falling edge (referred to below as a negative edge) of the pulse signal SIG16. The first buffer circuit 26 generates the first control signal Vg1, based on the output signal of the first dead time generation circuit 22.

The third RS flip-flop circuit 21, the second dead time generation circuit 24, and the second buffer circuit 28 generate the second control signal Vg2, based on the pulse signal SIG16'. The pulse signal SIG16' is inputted to a set terminal of the third RS flip-flop circuit 21, and the ON signal SIG10 is inputted to the reset terminal. An output signal SIG17 of the third RS flip-flop circuit 21 is inputted to the second dead time generation circuit 24. The second dead time generation circuit 24 makes this output at a high level after a predetermined dead time Td has passed from a positive edge of the output signal SIG17 of the third RS flip-flop circuit 21, and makes this output at a low level at the same time as a negative edge of the output signal SIG17. The second buffer circuit 28 generates the second control signal Vg2 based on the output signal of the second dead time generation circuit 24.

Since the switching transistor M1 and the synchronous rectification transistor M2 are respectively ON in time-periods in which the first control signal Vg1 and the second control signal Vg2 are at a high level, in the dead time Td time-period, each of the switching transistor M1 and the synchronous rectification transistor M2 are OFF.

Figure 4:
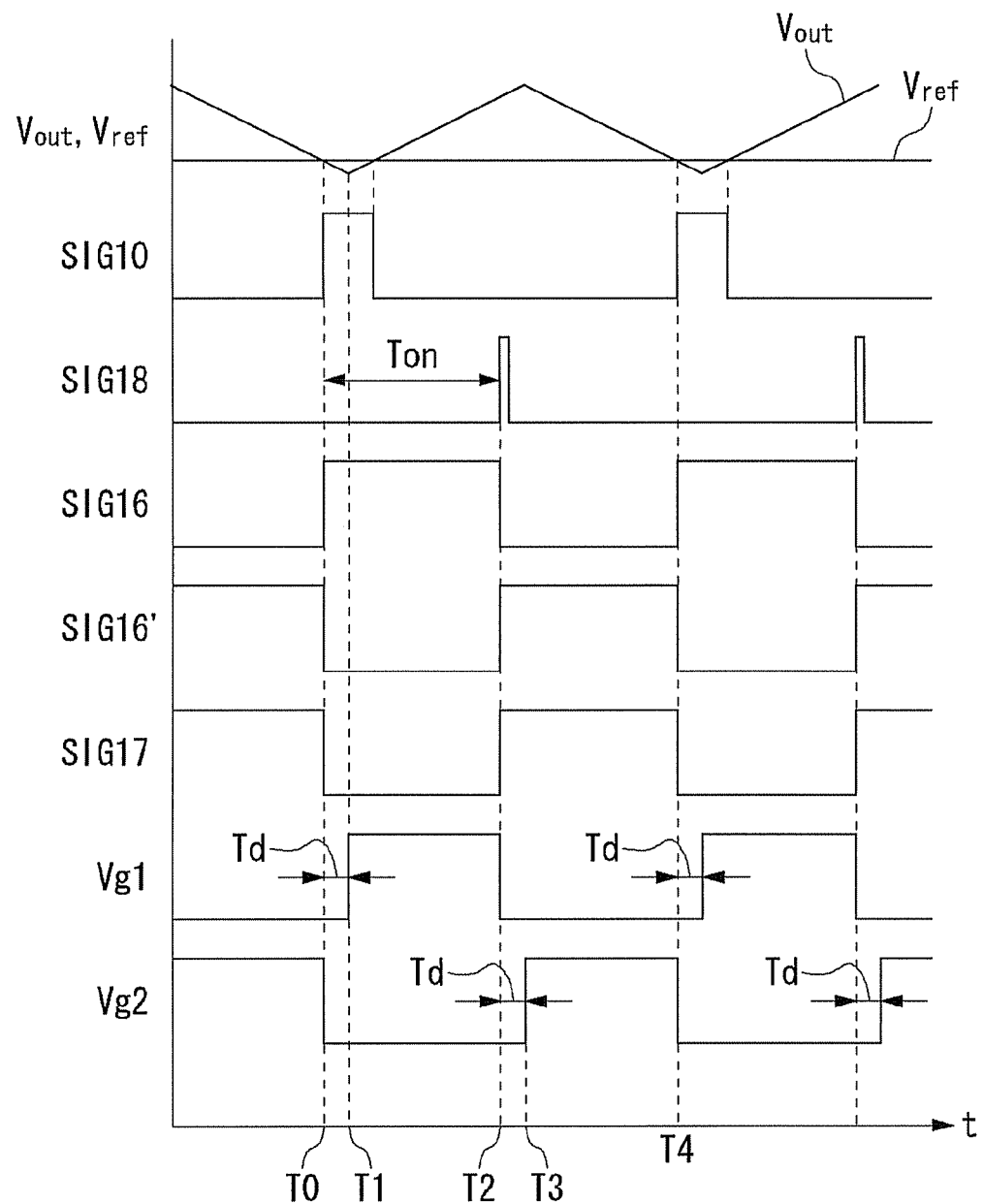
FIG. 4 is a time chart showing an operation state of the step-down switching regulator of FIG. 1.

Here, an explanation is given based on FIG. 4, concerning operation of the output monitoring comparator 10, the pulse modulator 12, the driver circuit 20, and the switching regulator output circuit 120. FIG. 4 is a time chart showing an operation state of the step-down switching regulator 200. In order to simplify the explanation here, the light load detection signal SIG12 is considered as being at a high level, and the AND gate 14 is ignored.

At time T0, when the output voltage Vout is lower than the reference voltage Vref, the ON signal SIG10 at a high level is outputted from the output monitoring comparator 10. The second RS flip-flop circuit 16 is set by this ON signal SIG10, and the pulse signal SIG16 goes to a high level.

At time T1 after the dead time Td has passed from when the pulse signal SIG16 has gone to a high level, the driver circuit 20 turns the switching transistor M1 ON, with the first control signal Vg1 at a high level, and the output voltage Vout is increased. Furthermore, at time T2 after the predetermined ON time Ton has passed from time T0, the reset signal SIG18 at a high level is outputted. The second RS flip-flop circuit 16 is reset by this reset signal SIG18, and the pulse signal SIG16 goes to a low level. The driver circuit 20 turns the switching transistor M1 OFF, with the first control signal Vg1 at a low level at time T2.

The driver circuit 20 puts the second control signal Vg2 to a high level at time T3 after the dead time Td has passed from time T2. When the second control signal Vg2 goes to a high level, the synchronous rectification transistor M2 is ON, and the output voltage Vout begins to drop. After that, at time T4, when the output voltage Vout once again decreases to the reference voltage Vref, the output monitoring comparator 10 outputs the ON signal SIG10 at a high level, and resets the second RS flip-flop circuit 16.

As shown in FIG. 4, when the light load detection signal SIG12 has a high level, the inverted output signal SIG16' of the second RS flip-flop circuit 16 and the output signal SIG17 of the third RS flip-flop circuit 21 are the same signal. Accordingly, in cases in which only heavy loading is considered, the third RS flip-flop circuit 21 need not be provided. A reason for providing the third RS flip-flop circuit 21 will be described later.

The step-down switching regulator 200 of the present embodiment drives the switching transistor M1 and the synchronous rectification transistor M2 by repeating states of time T0 to T4, and stabilizes the output voltage Vout at the predetermined reference voltage Vref.

The description now returns to FIG. 1. The control circuit 100 according to the present embodiment is further provided with the light load mode detector 30, in order to improve efficiency when loading is light. The light load mode detector 30 compares a switching voltage Vsw and a ground potential (0V), and at timing at which the ON signal SIG10 is outputted at a high level from the output monitoring comparator 10, when the switching voltage Vsw is higher than the ground potential, forcibly fixes at a low level and nullifies the ON signal SIG10.

The light load mode detector 30 includes a light load detection comparator 32, a first RS flip-flop circuit 34, and the delay circuit 36.

The non-inverted input terminal of the light load detection comparator 32 is grounded, and the switching voltage Vsw is inputted to the non-inverted input terminal. The light load detection comparator 32 compares the switching voltage Vsw and the ground potential, and outputs a comparison signal SIG20 at a high level when Vsw<OV, and at a low level when Vsw>OV.

A reset terminal of the first RS flip-flop circuit 34 is connected to an output terminal of the light load detection comparator 32, and the comparison signal SIG20 is inputted. Furthermore, the set terminal of the first RS flip-flop circuit 34 is connected to the second switching terminal 104, and the second control signal Vg2 is inputted. An output signal SIG22 of the first RS flip-flop circuit 34 is outputted to the delay circuit 36.

The delay circuit 36 becomes active in a state in which the first RS flip-flop circuit 34 is set, and delays the second control signal Vg2 of the synchronous rectification transistor M2; in an inactive state the delay circuit 36 outputs the second control signal Vg2 without giving it a delay. The output signal of the delay circuit 36 is outputted as the light load detection signal SIG12 to the pulse modulator 12.

The delay circuit 36 includes a first transistor M10, a second transistor M12, a third transistor M14, a delay resistor R10, and a delay capacitor C10.

The delay circuit 36 includes the first transistor M10, the delay resistor R10, and the second transistor M12 connected in series between the power supply voltage and ground. Gates of the first transistor M10 and the second transistor M12 are commonly connected, and the second control signal Vg2 is inputted. The first transistor M10, the second transistor M12, and the delay resistor R10 form an inverter which inverts and outputs the second control signal Vg2.

The delay capacitor C10 and the third transistor M14 are connected in series between a connection point of the delay resistor R10 and the second transistor M12, and ground. The output signal SIG22 of the first RS flip-flop circuit 34 is inputted to a gate which is a control terminal of the third transistor M14. The third transistor M14 is ON when the output signal SIG22 of the first RS flip-flop circuit 34 has a high level, and is OFF when the output signal SIG22 has a low level. When the third transistor M14 is ON, a CR circuit is formed by the delay capacitor C10 and the delay resistor R10, and the output signal SIG12 of the delay circuit 36 increases according to a CR time constant. On the other hand, when the third transistor M14 is OFF, since one end of the delay capacitor C10 is open, the CR circuit is not configured, and the delay circuit 36 outputs the second control signal Vg2 without a delay. In this way, the delay circuit 36 can switch between active and inactive states, based on the output signal SIG22 of the first RS flip-flop circuit 34.

Figure 5:
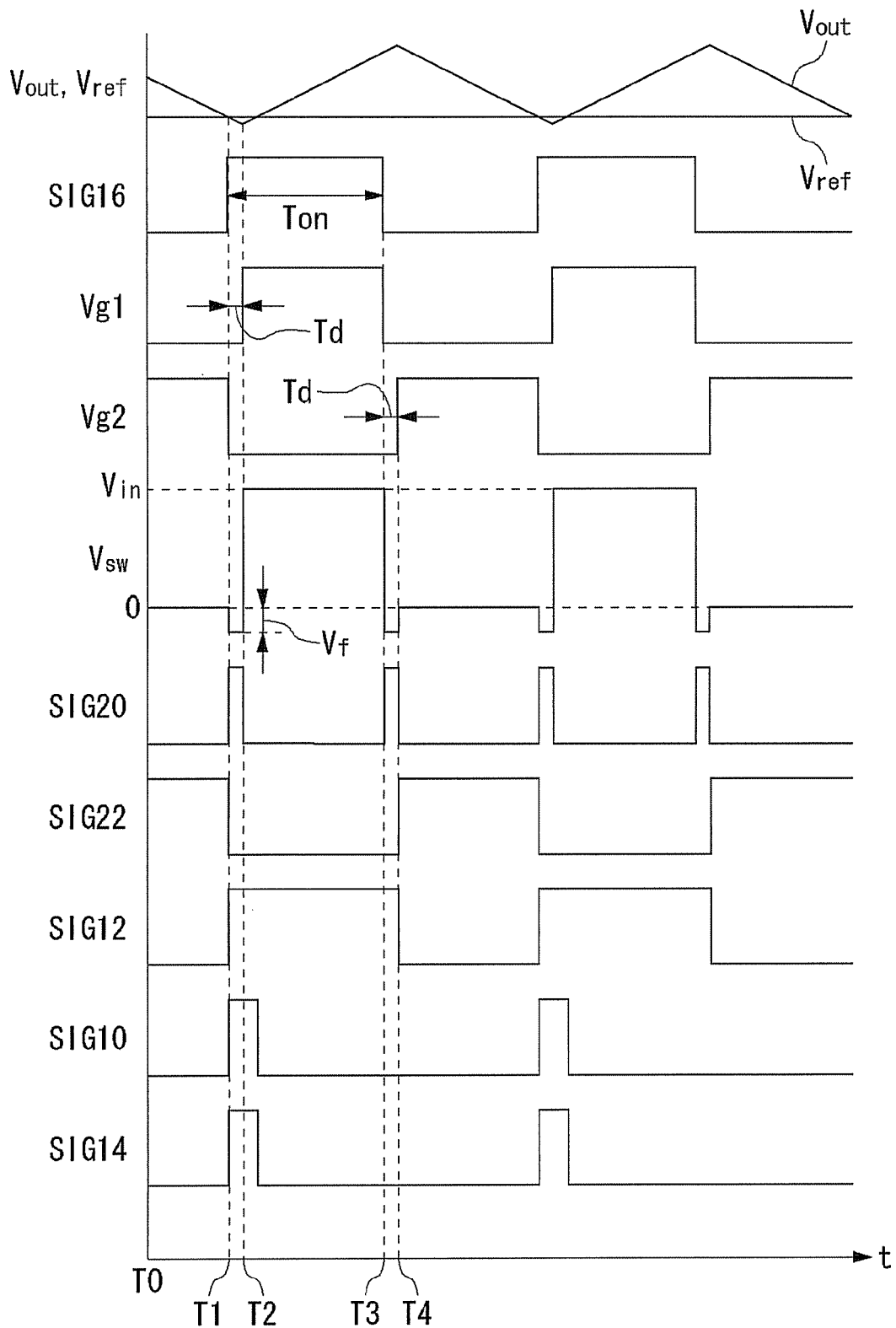
FIG. 5 is an operation waveform diagram of the step-down switching regulator of FIG. 1 when loading is heavy.
Figure 6:
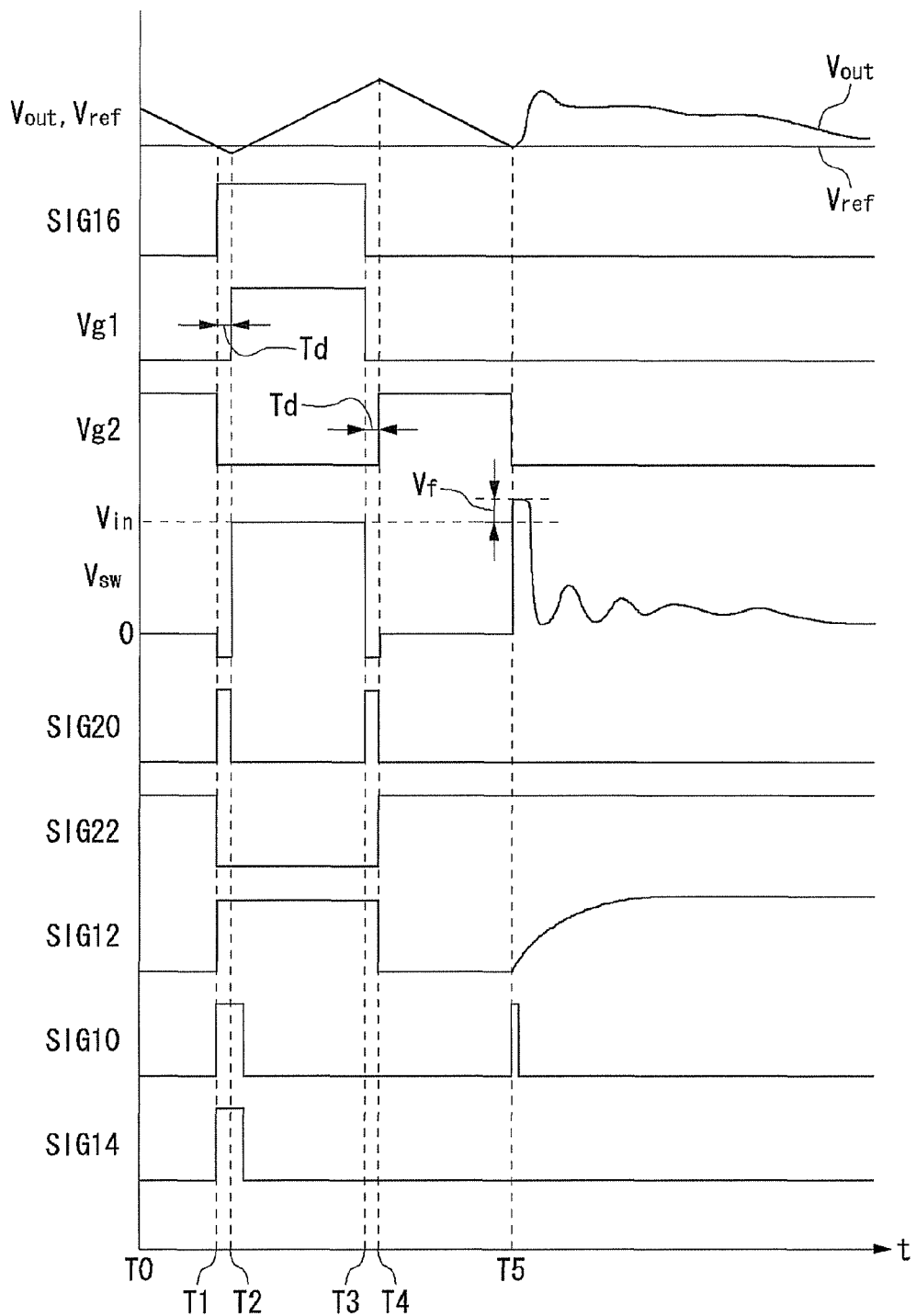
FIG. 6 is an operation waveform diagram of the step-down switching regulator of FIG. 1 when loading is light.

An explanation will be given, based on FIGS. 5 and 6, concerning operation of the step-down switching regulator 200 configured as above. FIG. 5 is an operation waveform diagram of the step-down switching regulator 200 when loading is heavy. FIG. 6 is an operation waveform diagram of the step-down switching regulator 200 when loading is light. Furthermore, FIGS. 7A and 7B show inductor current IL and output current Iout when loading is heavy, and when loading is light, respectively.

Figure 7A:
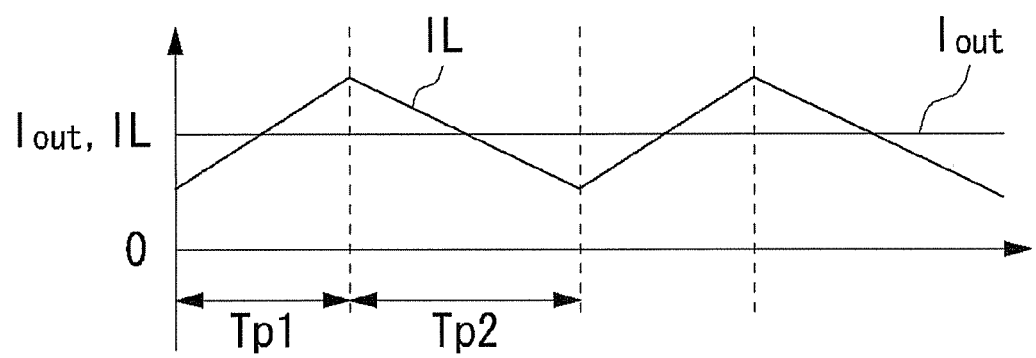
FIGS. 7A and 7B are operation waveform diagrams showing inductor current and output current when loading is heavy, and when loading is light, respectively.
Figure 7B:
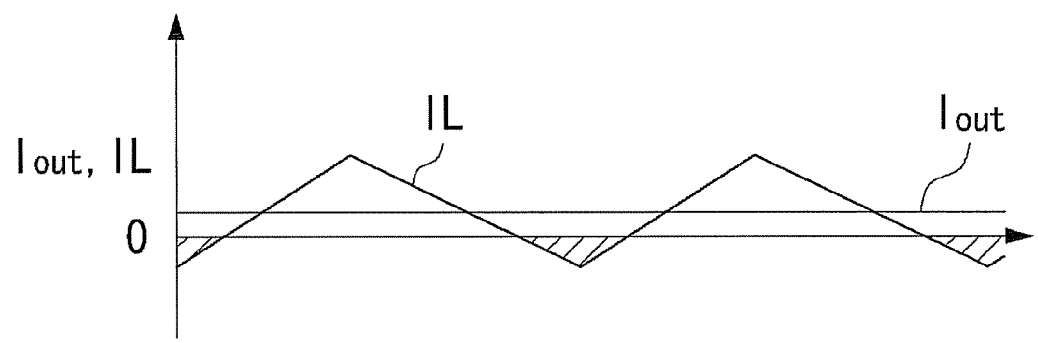

First, an explanation is given concerning operation when loading is heavy, referring to FIG. 5 and FIG. 7A.

In FIG. 5, a time-period from time T0 to T1 shows a state in which the synchronous rectification transistor M2 is ON. When the synchronous rectification transistor M2 is ON, the switching voltage Vsw has approximately a ground potential. As explained in FIG. 4, in the time-period in which the synchronous rectification transistor M2 is ON, the output voltage Vout decreases with time. At time T1, when the output voltage Vout goes below the reference voltage Vref, the ON signal SIG10, which is an output of the output monitoring comparator 10, goes to a high level.

When the ON signal SIG10 goes to a high level at time T1, the driver circuit 20 switches the second control signal Vg2 from a high level to a low level, and turns the synchronous rectification transistor M2 OFF. At this time, the delay circuit 36 is inactive, and since the second control signal Vg2 is inverted and outputted, the light load detection signal SIG12 goes to a high level at time T1. At time T1, when the ON signal SIG10 and the light load detection signal SIG12 both go to a high level, the output signal SIG14 of the AND gate 14 goes to a high level, the second RS flip-flop circuit 16 is set, and the pulse signal SIG16 goes to a high level.

Here, direction of the inductor current IL when the loading is heavy is focused upon. As shown in FIG. 7A, in either of a first time-period Tp1 in which the switching transistor M1 is ON, and a second time-period Tp2 at which the synchronous rectification transistor M2 is ON, the inductor current IL is positive. Accordingly, in a dead time-period in which both the switching transistor M1 and the synchronous rectification transistor M2 are OFF, the inductor current IL is supplied via a body diode D2. When the inductor current IL flows from ground via the body diode D2, the switching voltage Vsw has a voltage of −Vf, lower than the ground potential by one forward direction voltage Vf of the body diode D2.

At time T1 when the body diode D2 is ON and the switching voltage Vsw is negative, the light load detection comparator 32 outputs the comparison signal SIG20 which has a high level. The first RS flip-flop circuit 34 is reset by the comparison signal SIG20, which has a high level, and the output signal SIG22 of the first RS flip-flop circuit 34 goes to a low level. When the output signal SIG22 of the first RS flip-flop circuit 34 has a low level, since the delay circuit 36 is inactive, the second control signal Vg2 is inverted and outputted. As a result, the light load detection signal SIG12 goes to a high level. When the ON signal SIG10 and the light load detection signal SIG12 both go to a high level, since the output signal SIG14 of the AND gate 14 goes to a high level, the second RS flip-flop circuit 16 is set, and the pulse signal SIG16 goes to a high level.

At time T2 after the dead time Td has passed from when the pulse signal SIG16 has gone to a high level at time T1, the driver circuit 20 turns the switching transistor M1 ON, with the first control signal Vg1 at a high level. In the time-period in which the switching transistor M1 is ON, the switching voltage Vsw is approximately equal to the input voltage Vin. When the switching transistor M1 is ON, the output voltage Vout begins to rise.

At time T3 after the predetermined ON time Ton has passed from time T1, the second RS flip-flop circuit 16 is reset, and the pulse signal SIG16 goes to a low level. At the same time the driver circuit 20 turns the switching transistor M1 OFF, with the first control signal Vg1 at a low level. At time T3 when the switching transistor M1 is OFF, the switching transistor M1 and the synchronous rectification transistor M2 are both turned OFF. As a result, the inductor current IL is supplied, in the same way as from time T0 to T1, via the body diode D2. During this time, the switching voltage Vsw becomes −Vf, and the comparison signal SIG20 goes to a high level. At this time, since the first RS flip-flop circuit 34 is in a reset state, the output signal SIG22 thereof does not change.

At time T4 after the predetermined dead time Td has passed from time T3, the driver circuit 20 turns the synchronous rectification transistor M2 ON with the second control signal Vg2 at a high level. At this time, since the delay circuit 36 is inactive, the light load detection signal SIG12 transitions to a low level without a delay. At time T5, when the output voltage Vout decreases to the reference voltage Vref, the output monitoring comparator 10 once again outputs the ON signal SIG10 which is at a high level.

In this way, the step-down switching regulator 200 according to the present embodiment, when loading is heavy, performs a step-down operation, with an operation shown from time T1 to time T5 as one cycle, and stabilizes the output voltage Vtout to close to the reference voltage Vref.

Next, an explanation is given concerning operation of the step-down switching regulator 200 when loading is light, referring to FIG. 6 and FIG. 7B. In FIG. 6, a heavy load state is shown from time T0 to T4, and a switch to a light load occurs at time T4.

When the switch to a light load occurs at time T4, the inductor current IL and the output current Iout have a waveform shown in FIG. 7B. In portions of FIG. 7B with diagonal lines, the inductor current IL is negative. Accordingly, in a dead time in which both the switching transistor M1 and the synchronous rectification transistor M2 are OFF, the inductor current IL flows from the output capacitor Co via the body diode D1 to the input terminal 202. At this time, since the body diode D1 is ON, the switching voltage Vsw has a voltage of Vin+Vf, higher than the input voltage Vin applied to the input terminal 202 by one forward direction voltage Vf.

The description now returns to FIG. 6. After time T4, the output voltage Vout gradually decreases. At time T5, when the output voltage Vout is lower than the reference voltage Vref, the output monitoring comparator 10 outputs the ON signal SIG10 at a high level. Since the third RS flip-flop circuit 21 that is inside the driver circuit 20 is reset by this ON signal SIG10, the second control signal Vg2 goes to a low level, and the synchronous rectification transistor M2 is turned OFF. When the synchronous rectification transistor M2 is turned OFF at time T5, as explained in FIG. 7B, the inductor current IL flows via the body diode D1. As a result, the switching voltage Vsw increases to Vin+Vf, and the output voltage Vout increases therewith.

Here, operation of the light load mode detector 30 at time T5 is focused upon. At time T5, since Vsw>0V, the comparison signal SIG20 stays at a low level. Accordingly, the first RS flip-flop circuit 34 is not reset, and the output signal SIG22 thereof continues to maintain a high level. When the output signal SIG22 has a high level, the third transistor M14 in ON, the delay circuit 36 is active, and the light load detection signal SIG12 increases with a time constant. At time T5, the ON signal SIG10 has a high level, but since the light load detection signal SIG12 goes to a low level due to being delayed, the output signal SIG14 of the AND gate 14 has a low level. As a result, at time T5, the second RS flip-flop circuit 16 is not set, and the pulse signal SIG16 continues to maintain a low level.

When the pulse signal SIG16 continues to maintain a low level, driving of the switching transistor M1 and the synchronous rectification transistor M2 by the driver circuit 20 is stopped. After time T5, when both the switching transistor M1 and the synchronous rectification transistor M2 have a high impedance, LC resonance is induced by the output capacitor Co and the output inductor L1 of the switching regulator output circuit 120, and the output voltage Vout gradually decreases while oscillating. In this way in a time-period until the output voltage Vout decreases to the reference voltage Vref, switching operation of the switching transistor M1 and the synchronous rectification transistor M2 is stopped.

According to the step-down switching regulator 200 according to the present embodiment, as above, by stopping the operation of the switching transistor M1 and the synchronous rectification transistor M2 when loading is light, it is possible to reduce gate drive current. By reducing the gate drive current, it is possible to improve conversion efficiency of the step-down switching regulator 200 as a whole.

In detecting a light load state, a full swing switching voltage Vsw is monitored, not with voltage step-down by a resistance element, but in a range wider than input voltage from ground. As a result, since it is not necessary to use a high performance comparator for the light load detection comparator 32, it is possible to curtail increase in circuit area.

Furthermore, the pulse modulator 12 performs a logical operation on the delayed second control signal Vg2, that is, the light load detection signal SIG12, and the ON signal SIG10, by the AND gate 14, to generate the pulse signal SIG16 based on a result thereof. As a result thereof, in a light load state in which the second control signal Vg2 is delayed, it is possible to nullify the ON signal SIG10, and to stop the switching operation.

Moreover, by providing the light load detection comparator 32, and switching, based on the switching voltage Vsw, active and inactive states of the delay circuit 36 that gives a delay to the second control signal Vg2, it is possible to delay the second control signal Vg2 only when loading is light, to nullify the ON signal SIG10, and it is possible to stop the switching operation.

Second Embodiment

Figure 8:
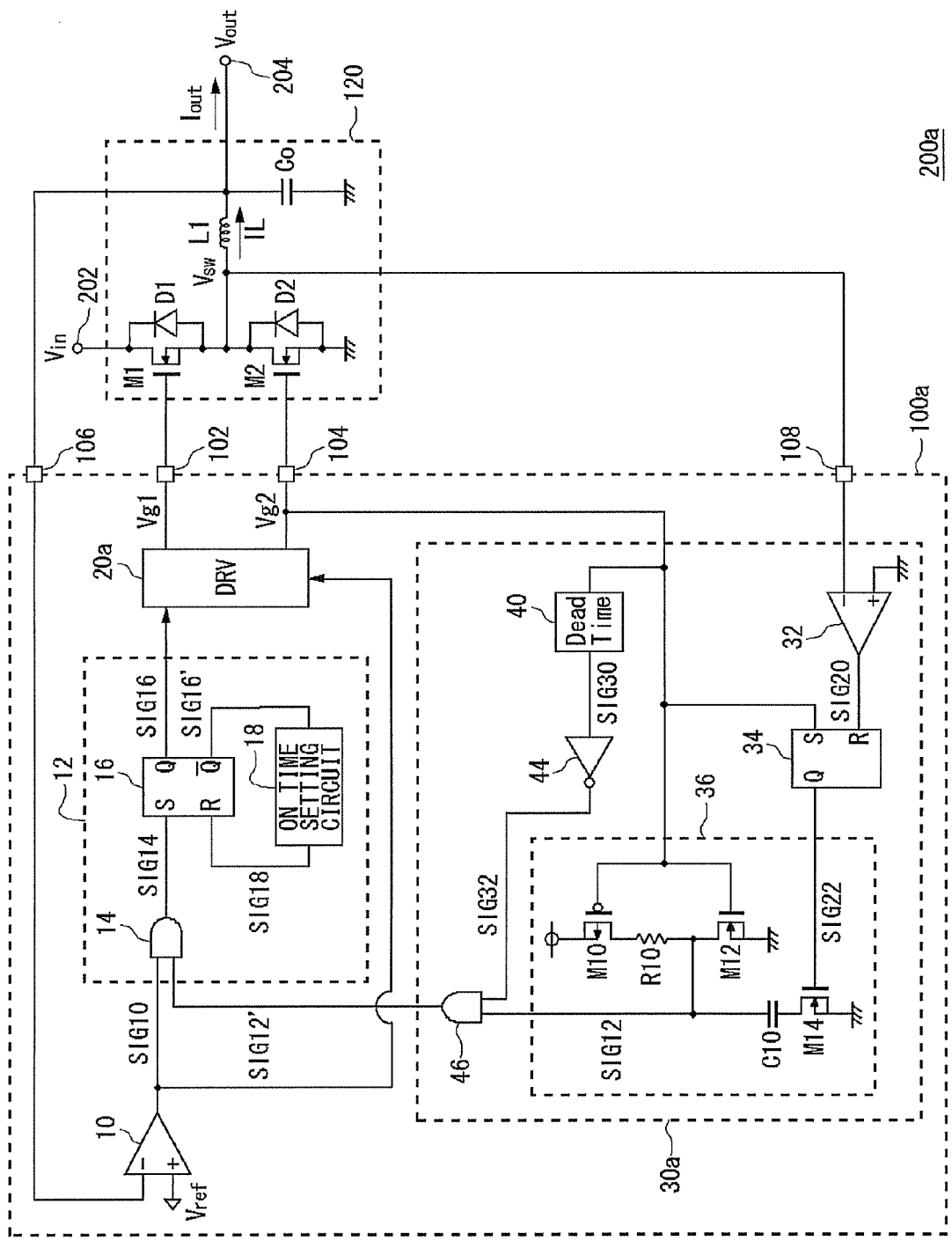
FIG. 8 is a circuit diagram showing a configuration of the step-down switching regulator according to a second embodiment.

FIG. 8 is a circuit diagram showing a configuration of a step-down switching regulator 200a according to a second embodiment. In the same figure, component elements that are the same or equivalent to FIG. 1 are given the same reference symbols, and explanations are omitted as appropriate. Below, explanations center on differences from the step-down switching regulator 200 of FIG. 1 explained in the first embodiment.

A control circuit 100a of FIG. 8 differs from the control circuit 100 of FIG. 1 in configuration of the light load mode detector 30 and the driver circuit 20.

A light load mode detector 30a of FIG. 8, in addition to the light load mode detector 30 of FIG. 1, is further provided with a third dead time generation circuit 40, an inverter 44, and an AND gate 46.

The third dead time generation circuit 40 outputs a signal SIG30, in which a negative edge of the second control signal Vg2 is delayed. The inverter 44 inverts an output signal SIG30 of the third dead time generation circuit 40. The AND gate 46 outputs a logical product of the output signal SIG12 of a delay circuit 36 and the output signal SIG32 of the inverter 44. An output signal SIG12' of the AND gate 46 is outputted from the light load mode detector 30a to the pulse modulator 12.

Figure 9:
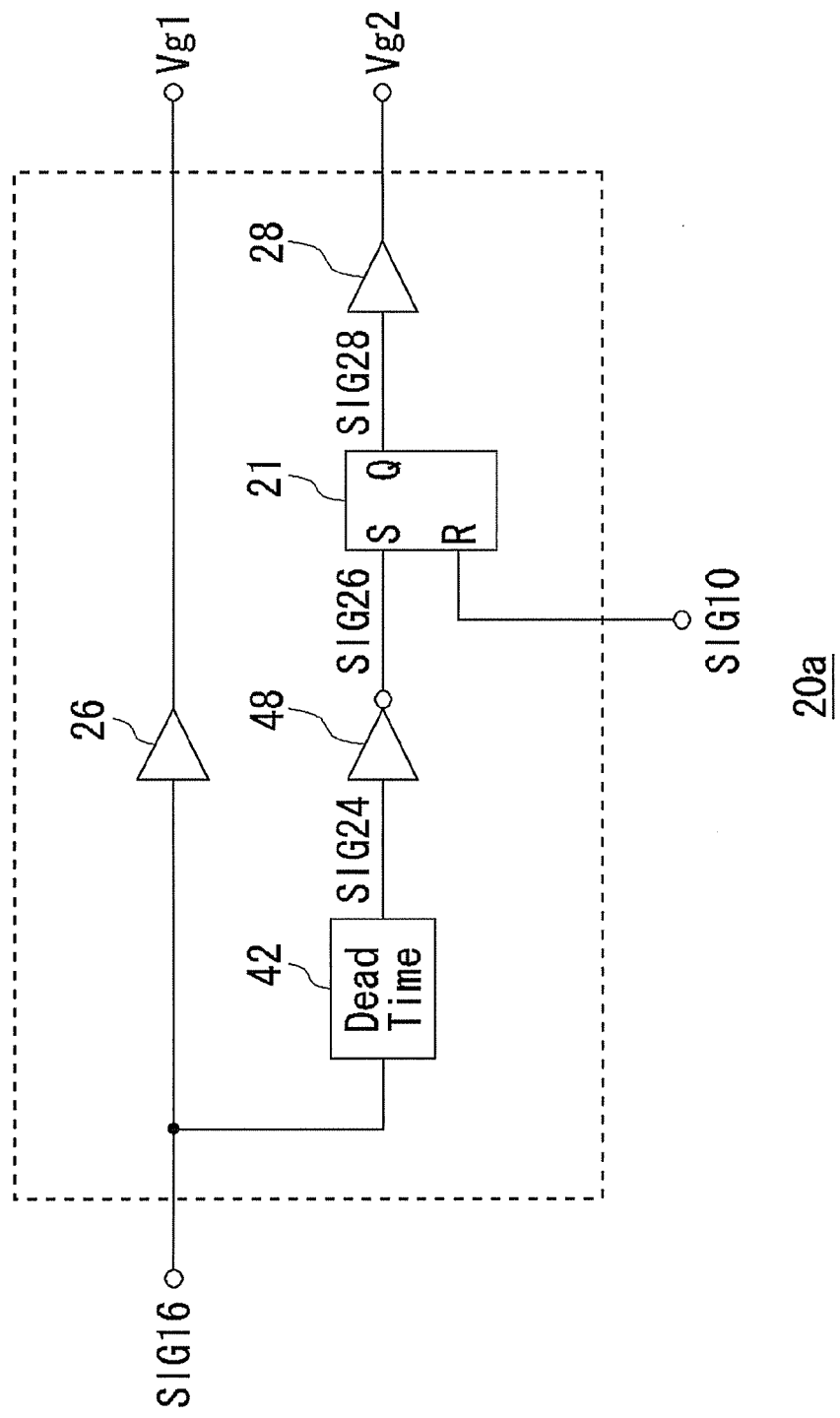
FIG. 9 is a circuit diagram showing a configuration of a driver circuit of FIG. 8.

FIG. 9 is a circuit diagram showing a configuration of a driver circuit 20a of FIG. 8. The driver circuit 20a, after a dead time Td, alternately turns ON a switching transistor M1 and a synchronous rectification transistor M2, based on a pulse signal SIG16 outputted from a pulse modulator 12 and an ON signal SIG10 outputted from an output monitoring comparator 10. The driver circuit 20 includes a first buffer circuit 26, a fourth dead time generation circuit 42, an inverter 48, a third RS flip-flop circuit 21, and a second buffer circuit 28.

The first buffer circuit 26 generates a first control signal Vg1 based on the pulse signal SIG16.

The fourth dead time generation circuit 42, the inverter 48, the third RS flip-flop circuit 21, and the second buffer circuit 28 generate the second control signal Vg2 based on the pulse signal SIG16. After the predetermined dead time Td has passed from a negative edge of the pulse signal SIG16, the fourth dead time generation circuit 42 outputs at a low level, and at the same time as a positive edge of the pulse signal SIG16, outputs at a high level. The inverter 48 inverts an output signal SIG24 of the fourth dead time generation circuit 42. An output signal SIG26 of the inverter 48 is inputted to a set terminal of the third RS flip-flop circuit 21, and the ON signal SIG10 outputted from the output monitoring comparator 10 is inputted to a reset terminal. The second buffer circuit 28 generates the second control signal Vg2 based on an output signal SIG28 of the third RS flip-flop circuit 21.

Figure 10:
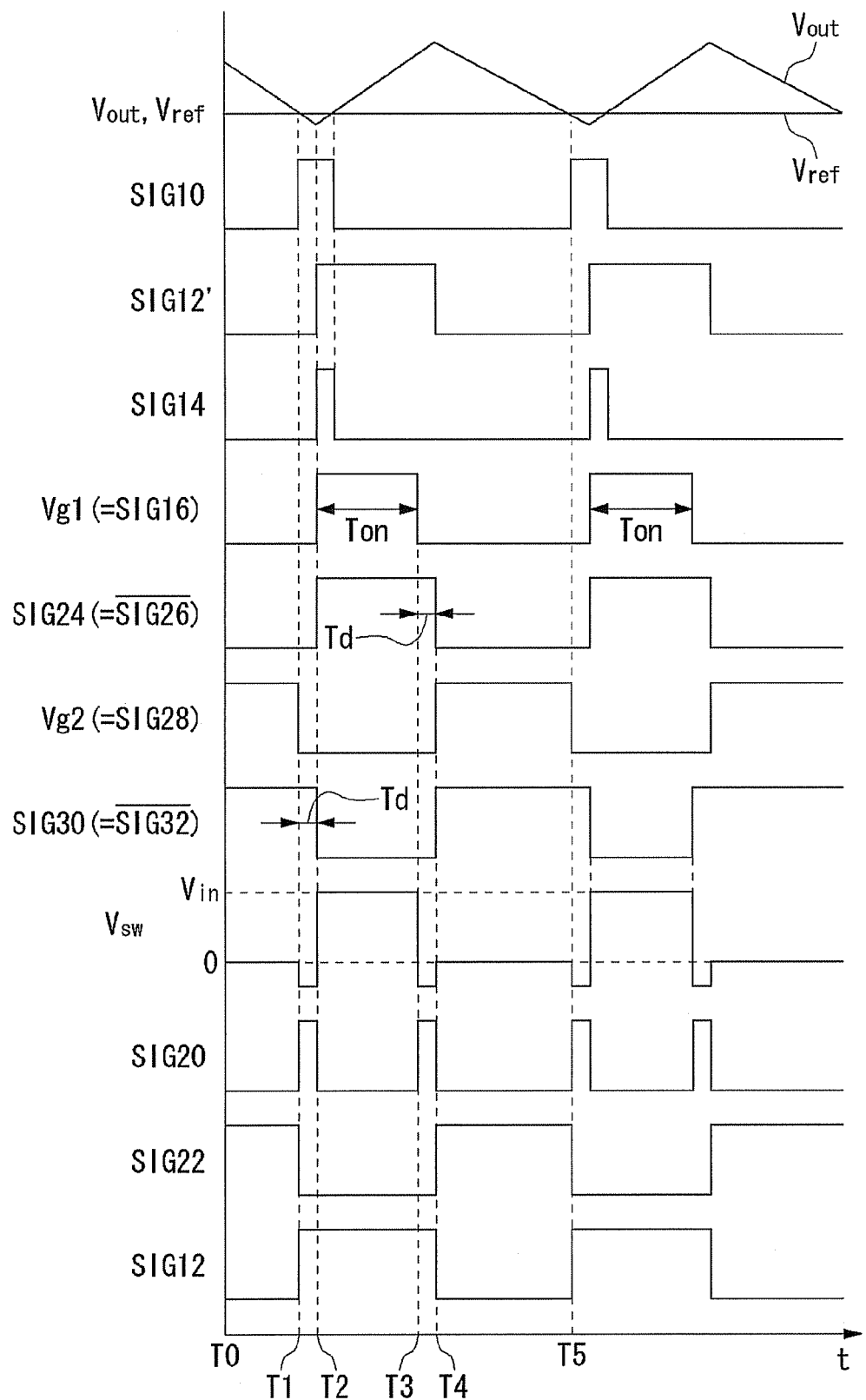
FIG. 10 is an operation waveform diagram of the step-down switching regulator of FIG. 8 when loading is heavy.
Figure 11:
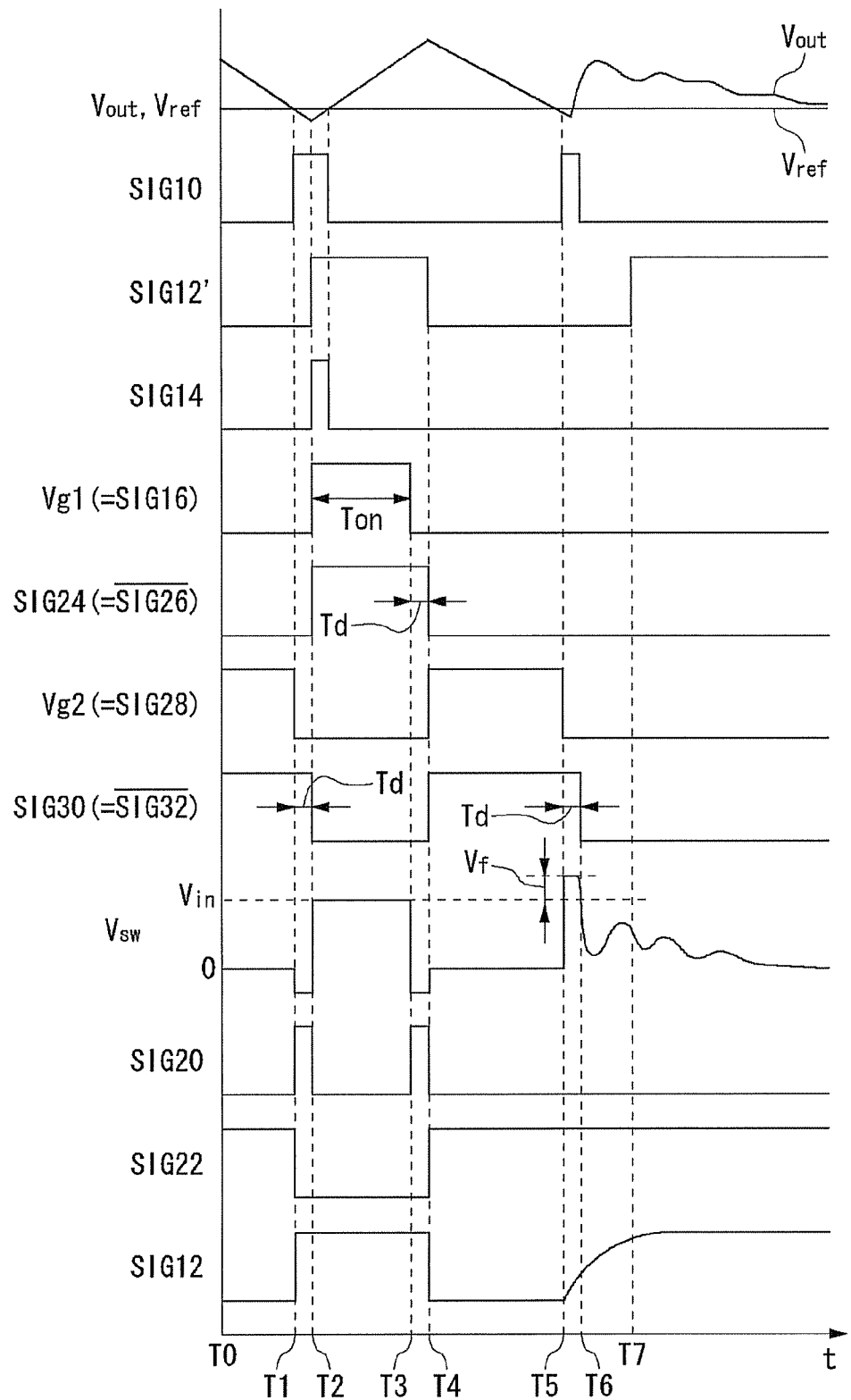
FIG. 11 is an operation waveform diagram of the step-down switching regulator of FIG. 8 when loading is light.

An explanation will be given based on FIGS. 10 and 11, concerning operation of the step-down switching regulator 200 according to the second embodiment configured as above. FIG. 10 is an operation waveform diagram of the step-down switching regulator 200a when loading is heavy. FIG. 11 is an operation waveform diagram of the step-down switching regulator 200a when loading is light.

First an explanation is given concerning operation when loading is heavy, referring to FIG. 10.

In FIG. 10, a time-period from time T0 to T1 shows a state in which the synchronous rectification transistor M2 is ON. When the synchronous rectification M2 is ON, the switching voltage Vsw has approximately a ground potential. In the time-period in which the synchronous rectification transistor M2 is ON, the output voltage Vout decreases with time. At time T1, when the output voltage Vout goes below the reference voltage Vref, the ON signal SIG10, which is an output of the output monitoring comparator 10, has a high level.

When the ON signal SIG10 goes to a high level at time T1, the third RS flip-flop circuit 21 of the driver circuit 20a is reset, an output signal SIG28 thereof and the second control signal Vg2 transitions to a low level, and the synchronous rectification transistor M2 turns OFF. When the synchronous rectification transistor M2 is OFF, a current flows in a body diode D2, and the switching voltage Vsw has a negative voltage. As a result thereof, a comparison signal SIG20, which is an output of the light load detection comparator 32, goes to a high level, the first RS flip-flop circuit 34 is reset, and an output signal SIG22 of the first RS flip-flop circuit 34 goes to a low level. By the output signal SIG22 going to a low level, the delay circuit 36 becomes inactive. By the delay circuit 36 becoming inactive at time T1, the output signal SIG12 of the delay circuit 36 becomes an inverted signal, wherein the second control signal Vg2 is not delayed.

The negative edge of the second control signal Vg2 is delayed by the predetermined dead time Td, by the third dead time generation circuit 40. At time T2 after the dead time Td has passed from time T1, the output signal SIG30 of the third dead time generation circuit 40 goes to a low level, and at the same time the output signal SIG32 of the inverter 44 goes to a high level.

When the output signal SIG32 of the inverter 44 goes to a high level at time T2, the output signal SIG12' of the AND gate 46 goes to a high level. At the same time, the output signal SIG14 of the AND gate 14 also goes to a high level, the second RS flip-flop circuit 16 is set and the first control signal Vg1 goes to a high level, and the switching transistor M1 is turned ON. When the switching transistor M1 is turned ON, the output voltage Vout begins to increase, and at a point in time when it exceeds the reference voltage Vref, the ON signal SIG10 goes to a low level once again. In a time-period in which the switching transistor M1 is ON, since the switching voltage Vsw is a voltage in a vicinity of the input voltage Vin, the comparison signal SIG20, which is an output of the light load detection comparator 32, goes to a low level.

At time T3 after the predetermined ON time Ton has passed from when the second RS flip-flop circuit 16 was set at time T2, the pulse signal SIG16 and the first control signal Vg1 go to a low level, and the switching transistor M1 turns OFF. When the switching transistor M1 turns OFF, a current flows in the body diode D2 once again, the switching voltage Vsw is a negative voltage, and the comparison signal SIG20 goes to a high level.

Furthermore, since the fourth dead time generation circuit 42 of the driver circuit 20a delays the negative edge of the pulse signal SIG16, at time T4 after the dead time Td has passed from T3, the output signal SIG24 goes to a low level. At time T4 the third RS flip-flop circuit 21 is set, the second control signal Vg2 and the output signal SIG28 of the third RS flip-flop circuit 21 go to a high level, and the synchronous rectification transistor M2 turns ON. When the synchronous rectification transistor M2 turns ON, the switching voltage Vsw is fixed in a vicinity of the ground potential, and the comparison signal SIG20 goes to a low level; the delay circuit 36 is set to be inactive, and, without delaying the second control signal Vg2, outputs the inverted output signal SIG12.

In order for the third dead time generation circuit 40 to delay only the negative edge of the second control signal Vg2, the output signal SIG30 thereof goes to a high level at the same time as the second control signal Vg2 goes to a high level at time T4, and the output signal SIG32 of the inverter 44 goes to a low level. At this time T4, the output signal SIG12' of the AND gate 46 transitions to a low level.

When the synchronous rectification transistor M2 turns ON at time T4, the output voltage Vout begins to decrease, and at time T5 becomes lower than the reference voltage Vref once again.

In this way, the step-down switching regulator 200a of FIG. 8 performs a step-down operation with an operation from time T1 to time T5 as a cycle, and outputs an output voltage Vout that is stabilized in a vicinity of the reference voltage Vref.

Next, an explanation will be given concerning operation of the step-down switching regulator 200a when loading is light, while referring to FIG. 11. In FIG. 11, a heavy load state is shown from time T0 to T4, and a switch to a light load occurs at time T4.

At time T5 when the output voltage Vout goes below the reference voltage Vref, the ON signal SIG10 goes to a high level. When the ON signal SIG10 goes to a high level, the driver circuit 20a turns the synchronous rectification transistor M2 OFF, with the second control signal Vg2 at a low level. When loading is light and the switching transistor M1 and the synchronous rectification transistor M2 are both OFF, since a current flows to the body diode D1, the switching voltage Vsw becomes a voltage higher than the input voltage Vin by one forward direction voltage Vf of the body diode D1. Since Vsw>0V holds at this time, the comparison signal SIG20 continues to maintain a low level.

When the comparison signal SIG20 maintains a low level, since the first RS flip-flop circuit 34 is not reset, the output signal SIG22 of the first RS flip-flop circuit 34 is fixed at a high level as it is, and the delay circuit 36 becomes active. At time T5 at which the second control signal Vg2 changes from a high level to a low level, since the delay circuit 36 is active, the output signal SIG12 of the delay circuit 36 gradually increases in accordance with a time constant. At time T6 after the dead time Td has passed from time T5, the output signal SIG30 of the third dead time generation circuit 40 goes to a low level.

At time T6 the output signal SIG30 of the third dead time generation circuit 40 goes to a low level, and the output signal SIG32 of the inverter 44 goes to a high level, but since the output signal SIG12 of the delay circuit 36 does not reach a high level, the output signal SIG12' of the AND gate 46 does not transition to a high level. After that, when the output signal SIG12 of the delay circuit 36 reaches a high level, the output signal SIG12' of the AND gate 46 goes to a high level.

At this time, since the ON signal SIG10 already has a low level, the output signal SIG14 of the AND gate 14 does not transition to a high level, and a low level is maintained. As a result, since the second RS flip-flop circuit 16 is not set, and the pulse signal SIG16 does not go to a high level, each of the switching transistor M1 and the synchronous rectification transistor M2 turn OFF, and switching operation is stopped.

In this way, similarly to the step-down switching regulator 200 according to the first embodiment, by stopping operation of the switching transistor M1 and the synchronous rectification transistor M2 when load is light, the step-down switching regulator 200a according to the second embodiment can reduce gate drive current. By reducing the gate drive current, it is possible to improve conversion efficiency of the step-down switching regulator 200 as a whole.

The embodiments are examples; various modified examples of combinations of various component elements and various processes thereof are possible, and a person skilled in the art will understand that such modified examples are within the scope of the present invention.

In the embodiments explanations have been given concerning cases in which the control circuit 100 is integrated as a unit on one LSI, but there is no limitation thereto, and part of the component elements may be arranged outside the LSI as discrete elements or as chip parts, or a configuration may be made of a plurality of LSIs. Decisions as to which part is integrated to what extent may be made based on cost, space occupied, and the like.

In the embodiments, an explanation has been given concerning cases in which the switching transistor M1 and the synchronous rectification transistor M2 are both N-channel MOSFETs, but P-channel MOSFETs may also be used. Furthermore, a transistor represented as a MOSFET may also be substituted with a bipolar transistor.

Moreover, in the embodiments setting of logical values at a high level and a low level are one example, and it is possible to freely make modifications by appropriate inversion, by an inverter or the like.

While the preferred embodiments of the present invention have been described using specific terms, such description is for illustrative purposes only, and it is to be understood that changes and variations may be made without departing from the spirit or scope of the appended claims.

The invention claimed is:

1. A control circuit of a synchronous rectification type of step-down switching regulator comprising a switching transistor and a synchronous rectification transistor, the control circuit comprising:
   an output monitoring comparator configured to compares output voltage of the switching regulator and a reference voltage that is a target value thereof, and to output an ON signal when the output voltage goes lower than the reference voltage;
   a light load mode detector configured to compare a switching voltage occurring at a connection point of the switching transistor and the synchronous rectification transistor, with a predetermined threshold voltage, and at timing at which the ON signal is outputted from the output monitoring comparator, to generate a light load detection signal having a first level when the switching voltage is a negative voltage, and to generate the light load detection signal having a second level when the switching voltage is a positive voltage;
   a pulse modulator configured to generates a pulse signal based on the ON signal and the light load detection signal so that (a) when the light load detection signal has the first level, the pulse signal has a predetermined level in a predetermined ON time from when the ON signal was outputted from the output monitoring comparator, (b) when the light load detection signal has the second level, the pulse signal is kept in a complementary level that is different from the predetermined level even if the ON signal was outputted from the output monitoring comparator;
   a driver circuit configured to generates a first and a second control signal based on the pulse signal and the ON signal, and to alternately turns ON, after a dead time, a switching transistor by the first control signal and a synchronous rectification transistor by the second control signal so that (c) the switching transistor turns on when the pulse signal transits to the predetermined level and the switching transistor turns off when the pulse signal transits to the complementary level and (d) the synchronous rectification transistor turns off when the ON signal is outputted and the synchronous rectification transistor turns on when the pulse signal transits to the complementary level.

2. A control circuit according to claim 1, wherein
   the light load mode detector, at timing at which the ON signal is outputted from the output monitoring comparator, when the switching voltage is higher than the threshold voltage, delays the second control signal so as to generate the light load detection signal; and
   the pulse modulator generates the pulse signal based on a result of a logical operation on the ON signal and the light load detection signal.

3. A control circuit according to claim 2, wherein the light load mode detector comprises:
   a light load detection comparator which compares the switching voltage at the connection point of the switching transistor and the synchronous rectification transistor, with the threshold voltage;
   a first flip-flop circuit which is set by the second control signal and reset by an output signal of the light load detection comparator; and
   a delay circuit which becomes active in a state in which the first flip-flop circuit is set, delays the second control signal, and in an inactive state outputs the second control signal without a delay being given thereto so as to generates the light load detection signal.

4. A control circuit according to claim 1, wherein the threshold voltage is a ground potential.

5. A control circuit according to claim 3, wherein the delay circuit comprises:
   a first transistor, a delay resistor, and a second transistor connected in series between a power supply voltage and ground; and
   a delay capacitor and a third transistor connected in series between a connection point of the delay resistor and the second transistor, and ground;
   and wherein the second control signal is inputted to control terminals of the first and the second transistor, and also output of the first flip-flop circuit is inputted to a control terminal of the third transistor, and the light load detection signal is output from a connection point of the delay resistor and the second transistor.

6. A control circuit according to claim 1, wherein the pulse modulator comprises:
 a second flip-flop circuit set by a result of a logical operation on the light load detection signal and the ON signal; and
 an ON time setting circuit which, after an ON time has passed from when the second flip-flip circuit was set, resets the second flip-flop circuit;
 and wherein an output signal of the second flip-flop circuit is outputted as the pulse signal.

7. A control circuit according to claim 1, wherein the driver circuit comprises:
 a third flip-flop circuit that is set by a signal, which is an inverse of the pulse signal, and reset by the ON signal, and generates the second control signal based on an output signal of the third flip-flop circuit.

8. A control circuit according to claim 1, wherein the control circuit is integrated as a unit on one semiconductor substrate.

9. A step-down switching regulator comprising:
 a switching regulator output circuit including a switching transistor and a synchronous rectification transistor, connected in series between an input terminal and ground; and
 the control circuit, according to claim 1, which drives the switching transistor and the synchronous rectification transistor.

10. An electronic device comprising:
 a battery;
 a microprocessor; and
 the step-down switching regulator, according to claim 9, which steps down voltage of the battery, to supply the microprocessor.

11. A control circuit according to claim 1, wherein the driver circuit turns off the synchronous rectification transistor at a first time at which the pulse signal transits to the predetermined level, turns on the switching transistor at a second time at which the dead time elapses from the first time, turns off the switching transistor at a third time at which the pulse signal transits to the complementary level, and turns on the synchronous rectification transistor at a fourth time at which the dead time elapses from the third time.

12. A control circuit according to claim 1, wherein the light load mode detector further comprises:
 a third dead time generation circuit configured to delay a negative edge of the second control signal;
 a logical circuit configured to generate a second light load detection signal based on a result of a logical operation on the light load detection signal and an output signal of the third dead time generation circuit, wherein the light load detector outputs the second light load detection signal instead of the light load detection signal, and wherein
 the driver turns off the synchronous rectification transistor at a first time at which the ON signal is output, turns on the switching transistor at a second time at which the pulse signal transits to the predetermined level, turns off the switching transistor at a third time at which the pulse signal transits to the complementary level, and turns on the synchronous rectification transistor at a fourth time at which the dead time elapses from the third time.

* * * * *